April 15, 1930. C. A. McGOUGH 1,754,637
PIPE FLANGING TOOL
Filed July 28, 1927 2 Sheets-Sheet 1
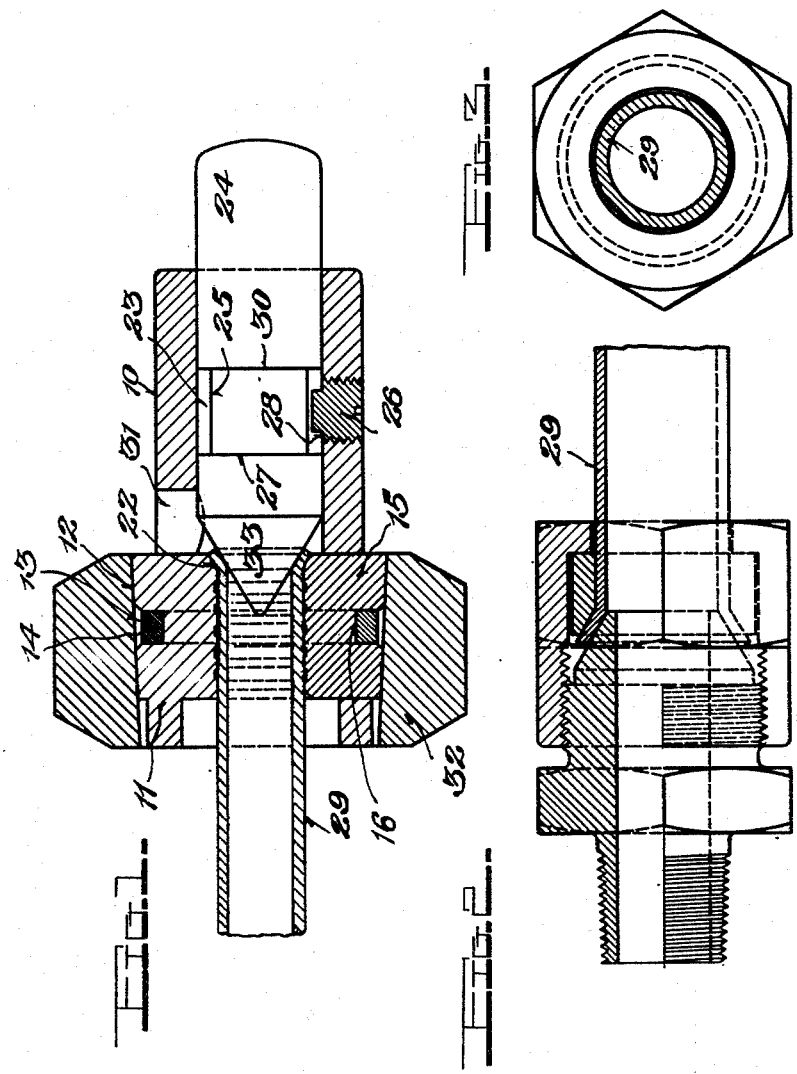
Inventor
Cyril A. McGough,
By N. E. Gee
Attorney April 15, 1930.  C. A. McGOUGH  1,754,637
PIPE FLANGING TOOL
Filed July 28, 1927   2 Sheets-Sheet 2
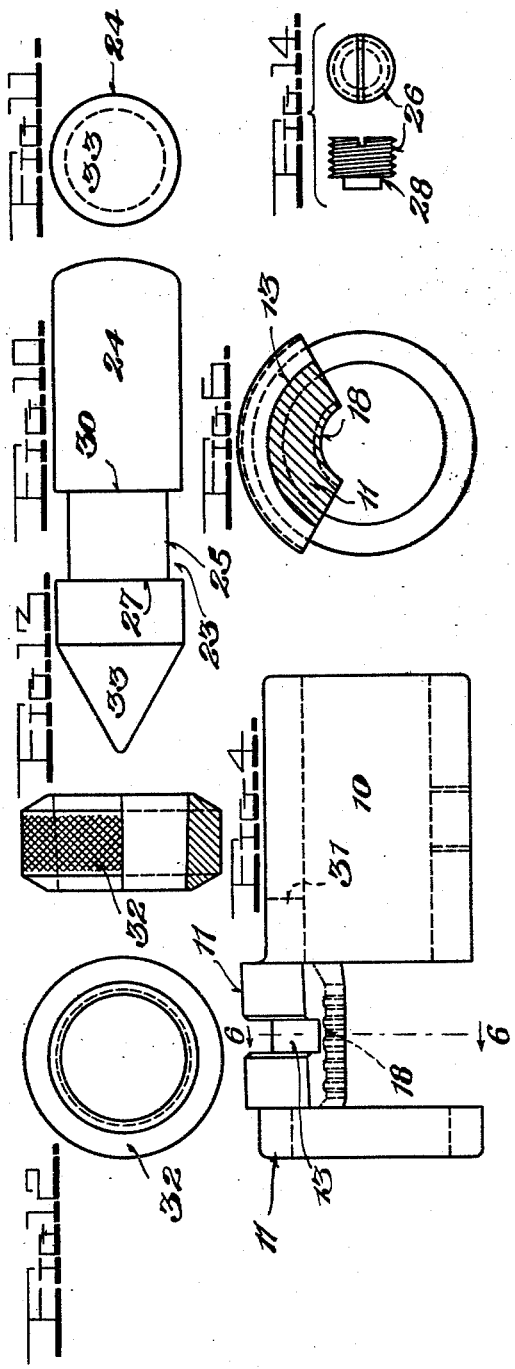
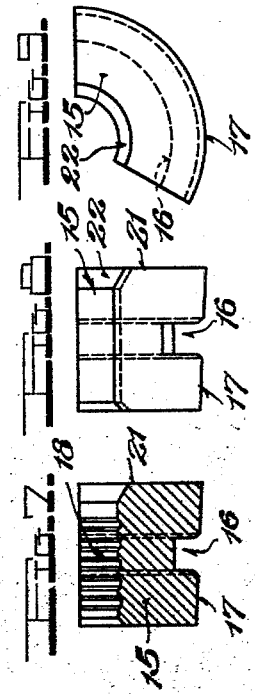
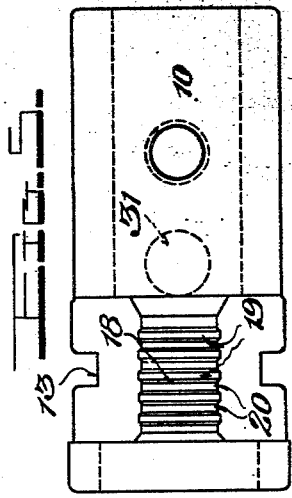
Inventor
Cyril A. McGough,
By N. E. Gee,
Attorney Patented Apr. 15, 1930

1,754,637

UNITED STATES PATENT OFFICE

CYRIL A. McGOUGH, OF ALTOONA, PENNSYLVANIA

PIPE-FLANGING TOOL

Application filed July 28, 1927. Serial No. 209,050.

This invention relates to pipe flanging, particularly in copper pipes, and has for its primary object an improved portable means of flanging the ends of copper pipe, where it is desired to form a pipe union, or a pipe joint that will be accurately formed to withstand high pressures, such as carried on modern steam locomotives.

Another object of this invention is to provide means for accurately alining the flanging tool with the axis of the pipe, thus insuring that the union, when completed, will be in axial alinement which is necessary when high pressures are carried.

A further object of this invention is to provide a pipe-flanging tool that readily permits the pipe to have formed thereon an inside nipple seat and an outside collar seat, both of which are formed simultaneously and free from ridges, projections and uneven surfaces, all of which are necessary for a perfect pipe joint when used on modern steam locomotives.

A still further object of this device is to provide a pipe-flanging tool suitable for flanging pipe used in fuel lines on automobiles, trucks and oil engines, where pressures must be maintained regardless of the vibration to which such pipe lines are subjected.

With these and many other objects in view, which will be more readily apparent as the nature of the invention is better understood, the same consists in the novel construction, combination and arrangement of parts as will be hereinafter fully pointed out, illustrated and claimed.

It will be quite readily understood by those skilled in the art to which this invention belongs, that the same is susceptible to some structural modification and arrangement of parts without departing from the spirit or scope of the invention; but a preferred and practical embodiment of the invention is shown in the accompanying drawings in which—

Fig. 1 is a cross-sectional view of my invention, showing a piece of pipe in place, as it appears when the flanging process has been completed.

Fig. 2 is a half-sectional view of a pipe union being formed after the flanging process has been completed, and shows the necessity of having the inside as well as the outside surface of the pipe flange accurately made in order that the union, when drawn together, will be in absolute alinement and all parts forming the joint being drawn together, forming a perfect joint.

Fig. 3 shows an end view of the parts as shown in Fig. 2, of the drawings.

Fig. 4 shows a side elevational view of the flanging tool frame.

Fig. 5 shows an inverted plan view of the parts shown in Fig. 4.

Fig. 6 shows a sectional view taken on the line 6—6 of Fig. 4 and illustrates the integral segment adapted to grip the pipe during the flanging process.

Fig. 7 shows a sectional view of the removable pipe holding segment element of the tool.

Fig. 8 is a side elevational view of the pipe holding segment element shown in Fig. 7.

Fig. 9 is an end view of the segment shown in Fig. 8.

Fig. 10 shows a longitudinal elevational view of the flanging pin shown in operative position in Fig. 1 of the drawings.

Fig. 11 shows an end view of the flanging pin shown in Fig. 10.

Fig. 12 is an elevational view of the tapered clamping ring used to clap the segments together on the pipe prior to the flanging process.

Fig. 13 is an edge view of the clamping ring.

Fig. 14 shows side and end views of the pin-locking screw, the function of which is to hold the flanging pin from falling out of place, as well as to gage the end of the pipe to be flanged such that all pipe flanges will be formed alike.

Similar reference numerals refer to similar parts throughout the several figures of the drawings.

My present invention consists essentially of a portable pipe flanging die and means for flanging pipe in the die, and to this end I provide a frame for the pipe-flanging dies, designated by the numeral 10. The frame or barrel 10 is made cylindrical in shape and has formed therewith a segment of the die used in the flanging process. This segment designated by the numeral 11 is made as an integral part of the die and forms one-third of the flanging die or 120 degrees of the complete circle. The outside face 12 of the segment 11 is tapered and is further provided with a recess in which a resilient member 14, such as a rubber band, is positioned for holding the loose segments 15 in operative position.

The segment 15 is constructed as a segment of a circle and is made to operate through an arc of 120 degrees, and two removable segments of this construction are used in forming the complete die. This segment is likewise provided with a recess 16, which receives the resilient member 14 as shown in Fig. 1 of the drawings.

The outside face 17, of the segments 15, is tapered, while the inside face 18 of each segment is provided with a series of alternate grooves 19 and projections 20, the latter of which serve to grip the pipe during process of flanging the pipe.

The inside edge 21 of each segment is provided with a counterbore 22, the angle of which is preferably made 30 degrees, as shown in Figs. 1 and 8 of the drawings.

The frame 10 is further provided with a longitudinal cylindrical opening 23, in which a removable flanging pin 24 is slidably positioned. The pin 24 is provided with a cone-shaped point 33, the diverging sides of which cone are positioned 60 degrees from each other, as shown in Fig. 1 of the drawings. The pin 24 is further provided with a recess 25 in which is positioned a locking dog 26. The function of this locking dog is to limit the backward and forward travel of the flanging pin. When the pin 24 is pushed back until the shoulder 27 strikes the edge 28 of the locking dog 26 and the pipe 29 to be flanged is pushed into the die, the pin 24 in its limited travel positions the end of the pipe before the flanging process begins, while the shoulder 30 on the flanging pin engages the locking dog after the flanging process has been completed, thus insuring the proper thickness of the metal in the bell-shaped pipe after the process of flanging has been completed.

In order to observe the flanging process, an observation opening 31 is provided in the frame 10, as shown in Fig. 1 and indicated in Fig. 4 of the drawings.

A ring 32 is provided, having a tapered opening made to conform with the taper formed on the integral segment as well as the taper formed on the outside face of the removable segments.

In using this portable flanging tool, the clamping ring 32 is moved down on the taper a sufficient distance to permit the movable segments to move outward, against the tension of the elastic band 14, the pipe 29 is then pushed into the die and is positioned in its correct place, when the shoulder 27 engages the edge 28 of the locking dog. The cone 33 enters the pipe and the ring 32 is driven up into place, clamping the segments firmly on the pipe. The flanging process is accomplished by striking the flanging pin with a hammer or similar tool, driving the cone into the pipe opening until the shoulder 30 strikes the locking dog or pin 26, after which the ring 32 is loosened on the dies and moved back, allowing the flanged pipe to be withdrawn from the die.

This tool is being quite extensively used in one of the largest railroad shops in the world.

Having described my invention, what I claim and desire to be secured by Letters Patent is:—

1. A pipe-flanging tool comprising a body including a barrel and a fixed die part, a removable die part for cooperating with the fixed die part, means for holding the fixed and removable die parts in assembled relation, a flanging pin arranged in the barrel, and a ring surrounding said fixed and removable die parts.

2. A pipe or tube flanging device including a body comprising a die part and a flanging pin barrel, a flanging pin movable in the barrel, means for limiting the movement of said pin with reference to the mouth of the die thereby to gage the depth of the flange to be formed on the pipe or tool, a removable die part for cooperating with and complementary to the die part of the body, and means for holding the die parts in assembled relation.

3. In a pipe-flanging tool, a plurality of radially movable segmental pipe-gripping members each having a tapered outer face, a ring having a tapered bore receiving said members whereby longitudinal movement of said ring relative to said members forces the latter into gripping engagement with a pipe positioned between said members, and means for flanging the end of a pipe gripped between said members.

4. In a pipe-flanging tool, a plurality of radially movable segmental pipe-gripping members each having a tapered outer face, an elastic band surrounding said members holding them in assembled relation, a ring having a tapered bore receiving said members whereby longitudinal movement of said ring relative to said members forces the latter into gripping engagement with a pipe positioned between said members, and means for flanging the end of a pipe gripped between said members.

5. A pipe-flanging tool comprising a frame inclusive of a cylinder, means carried by said frame for clamping a pipe substantially axially alined with said cylinder, a flanging pin longitudinally slidable in said cylinder, said pin having a tapered end adapted to be forced into the end of said pipe to spread and thereby flange the latter, and means retaining said pin within said cylinder and limiting longitudinal movement thereof with respect to said cylinder.

6. A pipe-flanging tool comprising a frame inclusive of a cylinder, means carried by said frame for clamping a pipe substantially axially alined with said cylinder, a flanging pin longitudinally slidable in said cylinder, said pin having a tapered end adapted to be forced into the end of said pipe to spread and thereby flange the latter, longitudinally spaced shoulders on said flanging pin, and a stop element carried by said cylinder extending into the space between said shoulders.

7. A pipe-flanging tool comprising a frame inclusive of a cylinder and a pipe-gripping segmental member integral therewith, other pipe-gripping radially movable segmental members for cooperation with said first-mention segmental member, an elastic band surrounding said segmental members holding them in assembly with one another, said segmental members having tapered outer faces, a ring having a tapered bore receiving said segmental members and longitudinally movable with respect thereto to effect clamping engagement of said members upon a pipe positioned between them, and a pin slidable in said cylinder, said pin having a tapered end adapted to be forced into the end of a pipe clamped between said members to effect flanging of said pipe.

In testimony whereof I affix my signature.

CYRIL A. McGOUGH.